United States Patent
Dhanabalan et al.

(10) Patent No.: US 10,897,424 B1
(45) Date of Patent: Jan. 19, 2021

(54) QUALITY OF EXPERIENCE BASED NETWORK ANALYSIS

(71) Applicant: Citrix Systems, Inc., Fort Lauderdale, FL (US)

(72) Inventors: Praveen Raja Dhanabalan, Bangalore (IN); Sachin Shelar, Bangalore (IN); Snigdhendu Mukhopadhyay, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/520,720

(22) Filed: Jul. 24, 2019

(51) Int. Cl.
*H04L 12/26* (2006.01)
*H04L 12/813* (2013.01)
*H04L 12/803* (2013.01)
*H04L 12/24* (2006.01)
*H04L 12/725* (2013.01)

(52) U.S. Cl.
CPC ............ *H04L 47/20* (2013.01); *H04L 41/147* (2013.01); *H04L 45/302* (2013.01); *H04L 47/125* (2013.01)

(58) Field of Classification Search
CPC ..... H04L 47/20; H04L 41/147; H04L 45/302; H04L 47/125; H04L 43/087
See application file for complete search history.

(56) References Cited

U.S. PATENT DOCUMENTS

| | | | |
|---|---|---|---|
| 6,496,477 B1 * | 12/2002 | Perkins | H04L 45/00 370/228 |
| 10,079,734 B1 | 9/2018 | Gegout et al. | |
| 10,505,817 B2 * | 12/2019 | Narsude | G06F 11/3466 |
| 2005/0204042 A1 * | 9/2005 | Banerjee | H04L 12/6418 709/226 |
| 2011/0007648 A1 * | 1/2011 | Liu | H04L 41/5003 370/252 |
| 2013/0223208 A1 * | 8/2013 | Liao | H04L 47/805 370/229 |
| 2014/0149573 A1 * | 5/2014 | Tofighbakhsh | H04L 41/5067 709/224 |
| 2015/0304737 A1 * | 10/2015 | Franklin | H04N 21/44209 725/14 |
| 2018/0123887 A1 | 5/2018 | Thubert et al. | |
| 2019/0116539 A1 * | 4/2019 | Kolar | G06N 20/00 |
| 2020/0153701 A1 * | 5/2020 | Mohan | H04L 43/10 |

OTHER PUBLICATIONS

Oct. 21, 2020—(WO) International Search Report and Written Opinion—App PCT/US2020/043040.

* cited by examiner

*Primary Examiner* — Minh Trang T Nguyen
(74) *Attorney, Agent, or Firm* — Banner & Witcoff, Ltd.

(57) ABSTRACT

Methods and systems for changing communication paths in a network based on predicted Quality of Experience metrics are described herein. Computing devices in a network may communicate via one or more communication paths and using one or more applications. One or more Quality of Experience metrics may be determined for the one or more applications. Network metrics for the network may be measured and, based on one or more Quality of Service policies for the network, predicted Quality of Experience metrics may be determined using, e.g., a model network. A communication path recommendation may be output based on the predicted Quality of Experience metrics. For example, the recommendation may cause an application to change from a first communication path to a second communication path.

20 Claims, 5 Drawing Sheets

QUALITY OF EXPERIENCE BASED NETWORK ANALYSIS

FIELD

Aspects described herein generally relate to computer networking, remote computer access, virtualization, enterprise mobility management, and hardware and software related thereto. More specifically, one or more aspects describe herein provide for computing network analysis and modification based, at least in part, on predicted quality of experience metrics.

BACKGROUND

A user's experience with an application using a network may be dependent on how well the network functions. For example, network latency may cause a remotely-accessed application to run slowly, such that use of the application is undesirably difficult. As another example, low network bandwidth may cause an application displaying video content received via the network to display low-quality video content.

While modifications to the manner in which an application uses a network (e.g., the communication path through which a first computing device corresponds with one or more other computing devices) may improve user experience, determining the effect of the modification on user experience and the network as a whole can be prohibitively difficult. For example, a user switching from a low-bandwidth path to a high-bandwidth path in a network might suggest an improvement in the user's experience, but other aspects of the high-bandwidth path (e.g., that it involves more hops to reach a destination and thereby has a higher average total latency) may in fact worsen user experience. Moreover, if many computing devices in a network frequently change the path which they use to reach another computing device in a network, the network as a whole may be adversely effected, harming user experience for many users. It can be particularly difficult to determine the implications of communication path changes with respect to Quality of Service (QoS) policies, as such policies may have significant implications for transmissions across a large swath of a network.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards predicting quality of experience associated with one or more communication paths in a computer network. A first computing device, such as an administrative computing device, may receive, from a second computing device, a quality of experience (QoE) metric associated with an application executing on the second computing device. That application may use a first communication path, of a plurality of communication paths in the network, for communications between the second computing device and a third computing device. The QoE metric may indicate a subjective or objective quality of experience of a user of the application. For example, a QoE metric may be a range of values calculated based on factors such as network latency, jitter, and packet drop which indicates a predicted subjective or objective quality of experience, by a user, with an application. Network metrics for a plurality of communication paths in the network may be determined. For example, the network metrics may comprise a measurement of bandwidth, latency, and/or jitter. For each of the plurality of communication paths in the network, a predicted QoE metric may be determined. The predicted QoE metric may be based on the network metrics, the measured QoE metric, or other factors. The predicted QoE metrics may be further based on one or more QoS policies. For example, a QoS policy may relate to packet duplication and/or load balancing across multiple communication paths, retransmitting lost packets, persistent use of a single communication path, or the like. The predicted QoE metrics may further be based on a history of communication path changes in the network. For example, if a large number of different computing devices have changed communication paths recently, the predicted QoE metrics may be based on an assumption that further changes to communication paths may negatively impact network performance. Based on a comparison of the predicted QoE metrics for the plurality of communication paths, a second communication path may be selected and a recommendation associated with the second communication path may be output. For example, a first communication path may be associated with a measured QoE metric, and a second communication path may be associated with a predicted QoE metric which is associated with a better user experience than the first communication path, such that a recommendation to use the second communication path may be output. Output of the recommendation may comprise transmitting an instruction to the second computing device which causes the second computing device to connect to the third computing device via the second communication path.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards analyzing and modifying communications network paths based on, e.g., predicted QoE metrics. Computing devices executing applications may connect to other computing devices using one or more communication paths in a network. For example, a communication path may comprise multiple hops comprising network routers, packet switches, servers, and the like. A user of a computing device may have their experience positively or negatively impacted by the quality of such communication paths. For example, a fast communication path may permit a user to quickly browse a website using a web browser application, whereas a slow communication path may negatively impact a user's ability to play a fast-paced video game application. An administrative computing device may be configured to modify a network by, e.g., transmitting instructions to one or more computing devices which cause such computing devices to use different communication paths in the network.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
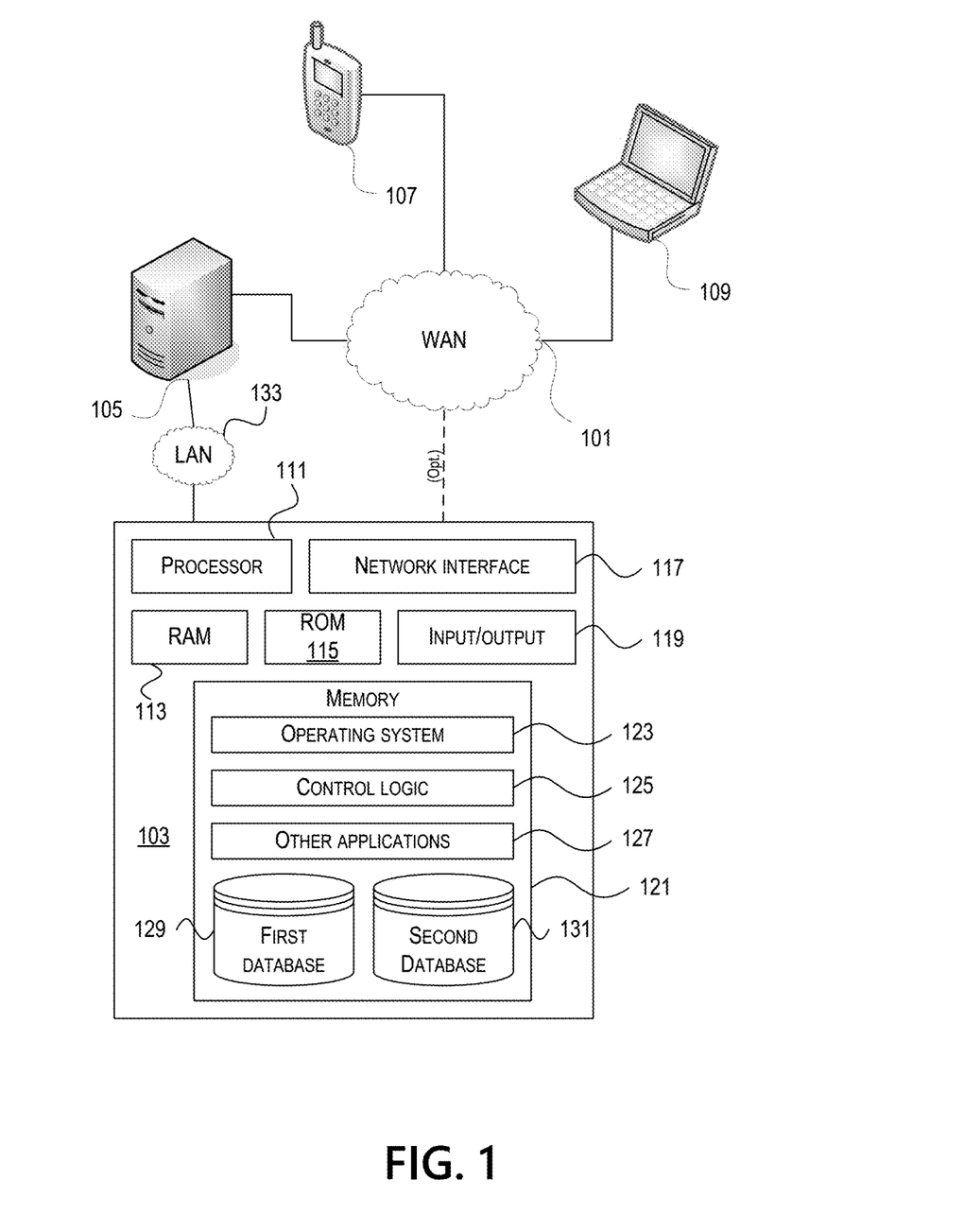
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. The functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
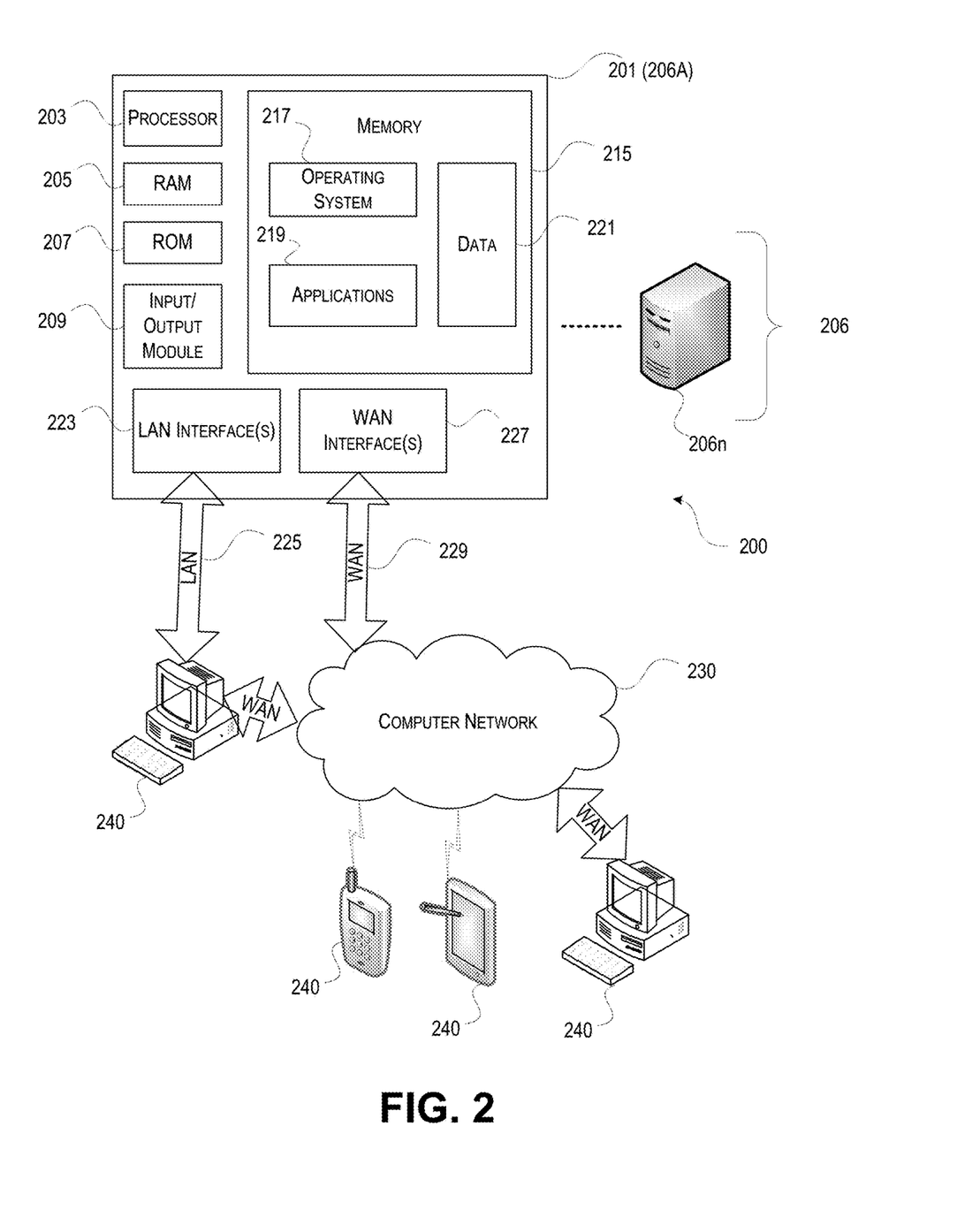
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). The network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
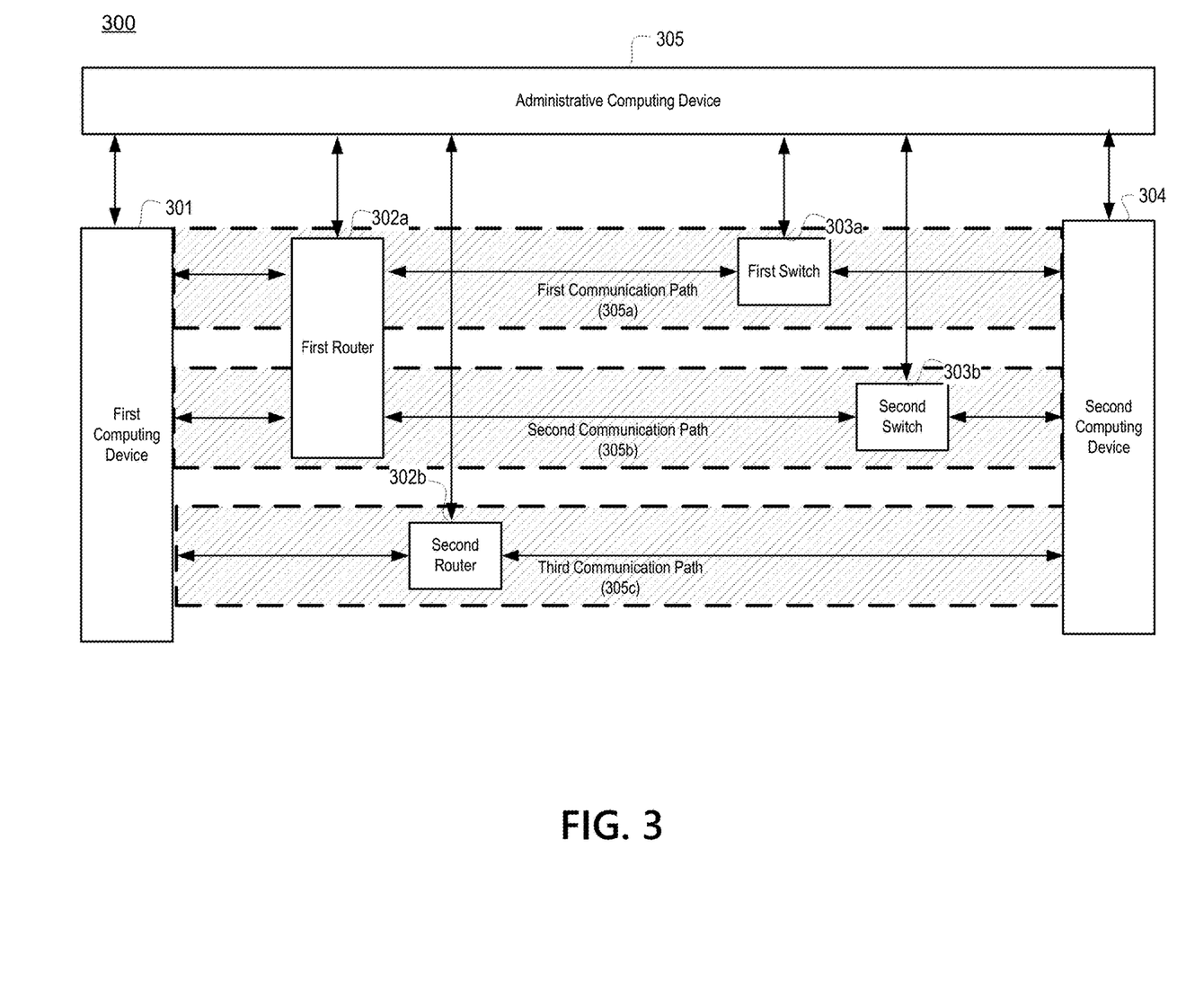
FIG. 3 shows communication paths between a first computing device and a second computing device.

FIG. 3 shows three communication paths in a network 300 between a first computing device 301 and a second computing device 304. An administrative computing device 305 may be communicatively coupled to the first computing device 301 and/or the second computing device 304 via the network 300 and/or a different network. There may be an infinite number of communication paths in the network 300, including an infinite number of computing devices in the network 300. The first computing device 301, the second computing device 304, and the administrative computing device 305 may be the same or similar as the devices 103, 105, 107, and 109. The first communication path 305a comprises a first hop from the first computing device 301 to a first router 302a, a second hop from the first router 302a to a first switch 303a, and a third hop from the first switch 303a to the second computing device 304. The second communication path 305b comprises a first hop from the first computing device 301 to the first router 302a, a second hop from the first router 302a to a second switch 303, and a third hop from the second switch 303b to the second computing device 304. The third communication path 305c comprises a first hop from the first computing device 301 to a second router 302b and a second hop from the second router 302b to the second computing device 304. Additional routers, switches, and/or other computing devices may be part of one or more of the communication paths depicted in FIG. 3. There may be an infinite number of communication paths between two computing devices, which may comprise the same or similar intermediary computing devices. For example, the first communication path 305a and the second communication path 305b both comprise the first router 302a.

Network metrics may be measured for one or more communication paths, such as the first communication path 305a, the second communication path 305b, and/or the third communication path 305c. A network metric may be any measurement of any aspect of a communication path, including a portion of a communication path. For example, a network metric may comprise one or more measurements of bandwidth, latency, jitter, or the like. Network metrics may comprise the sum, average, or other collection of one or more network metrics. For example, the third communication path 305c may be said to comprise two hops: a first hop from the first computing device 301 to the second router 302b and a second hop from the second router 302b to the second computing device 304. Accordingly, the average latency for the third communication path 305c may comprise the sum of the latency of the first hop from the first computing device 301 to the second router 302b with the latency of the second hop from the second router 302b to the second computing device 304. As another example, an average latency for the first communication path 305a may be measured by averaging a number of different latency measurements for the first communication path 305a.

The first computing device 301 may execute one or more applications which communicate with the second computing device 304. For example, the first computing device 301 may execute a web browser application configured to display a web page retrieved from the second computing device 304. As another example, the first computing device 301 may be the same or similar as the client machine(s) 240, and the second computing device 304 may be the same or similar as the server 206, such that the first computing device 301 may be configured to execute a remote-display application via the second computing device 304. The one or more applications may be configured packets to, and receive packets from, one or more computing devices. The application may be configured to select one or more communication paths to transmit such packets. For example, an application executing on the first computing device 301 may be configured to transmit packets to the first router 302a and/or the second router 302b, thereby providing it indirect control over whether the packets are transmitted via the first communication path 305a, the second communication path 305b, and/or the third communication path 305c.

The first computing device 301 may be configured to switch between communication paths, such as the first communication path 305a, the second communication path 305b, and the third communication path 305c. For example, the first communication path 305a may no longer be available (e.g., the first switch 303a may malfunction), and the first computing device 301 may switch from using the first communication path 305a to using the second communication path 305b. Switching communication paths may have implications for network metrics. For example, switching from the first communication path 305a to the second communication path 305b may lessen load on the first switch 303a and increase load on the second switch 303b. This may be undesirable where, for example, the second switch 303b is overloaded. As another example, multiple computing devices switching communication paths in a network rapidly may cause the network to slow, as the load imposed on and availability of any intermediary computing device (e.g., the first router 302a) in the network may be unpredictable, and one or more portions of the network may become undesirably burdened.

The administrative computing device 305 may be configured to cause one or more computing devices, such as the first computing device 301 and/or the second computing device 304, to switch between communication paths. For example, the administrative computing device 305 may transmit an instruction to an application executing on the first computing device 301 that causes the application to switch from transmitting packets via the first communication path 305a to the third communication path 305c. The administrative computing device 305 may also be configured to transmit instructions to intermediary computing devices, such as the first router 302a and/or the first switch 303a, which cause such changes in communications paths. For example, the administrative computing device 305 may be configured to transmit, to the first router 302a, an instruction which causes packets originally traveling along the first communication path 305a to be transmitted via the second communication path 305b by routing the packets from the first switch 303a to the second switch 303b.

QoE Measurement and Path Evaluation

Figure 4:
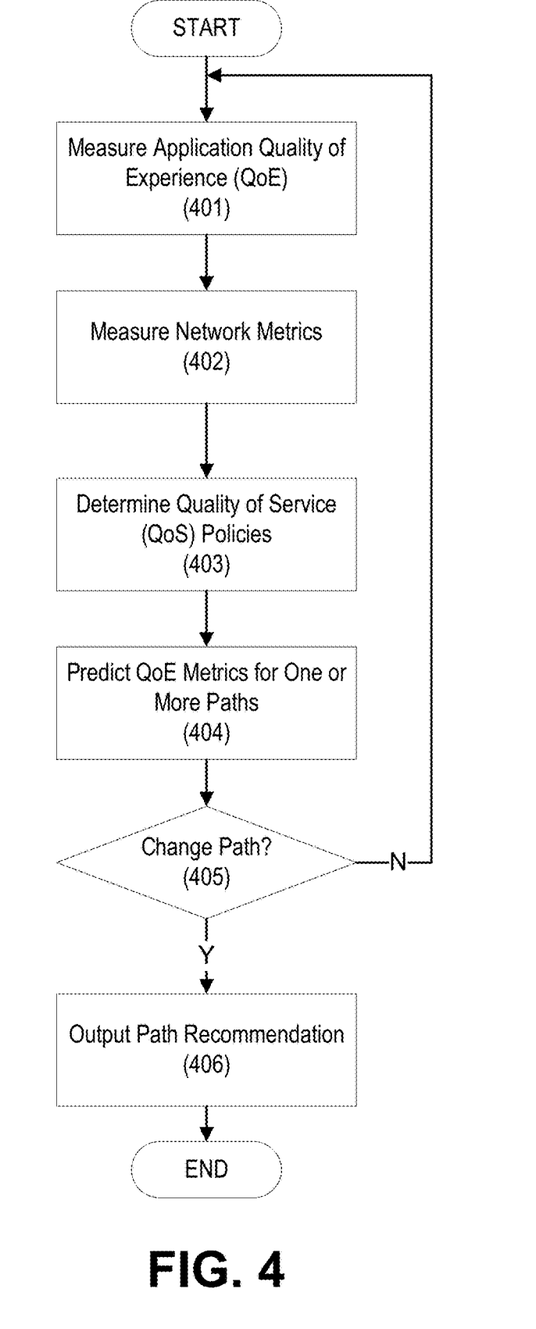
FIG. 4 is a flow chart comprising steps which may be performed by an computing device with respect to communication paths in a network.

FIG. 4 is a flow chart which may be performed by a computing device with respect to one or more paths, such as the paths depicted in FIG. 3. FIG. 4 may comprise or be part of an algorithm, such as an algorithm that may be stored in memory and executed by one or more processors of a computing device. For example, an administrative computing device (e.g., the administrative computing device 305) may be communicatively coupled to one or more computing devices (e.g., the first computing device 301, the first router 302a, and/or the first switch 303a) in a network and may be capable of receiving, from the one or more computing devices, QoE metrics associated with applications executing on those computing devices.

In step 401, one or more QoE metrics for an application executing on a computing device may be measured. A QoE metric may be any measurement of the objective or subjective experience of a user with respect to one or more applications. For example, a perceived lag time between user input and application output may be a QoE metric. As another example, for remote-access applications, the difference in reaction time of an application between a locally-executing application and a remotely-executing application may be measured. A QoE metric may be based, in whole or in part, on network metrics. For example, an increase in latency, as reflected in a network metric, may negatively impact user experience, which may be reflected in one or more QoE metrics. A computing device (e.g., the first computing device 301) may measure one or more QoE metrics by, for example, measuring various aspects of an executing application. A computing device may additionally and/or alternatively measure one or more QoE metrics by prompting a user of the application. For example, a user may be asked whether they are satisfied with their application experience. As another example, a user may be able to select (e.g., in a menu of an application) an option which indicates that the user is experiencing difficulty with the application. QoE metrics may be determined by an application based, e.g., on unique properties of the application. For example, an application enabling a user to remotely access applications hosted on a server may be configured to periodically determine one or more QoE metrics based on the user's ability to use the remote application as if it were locally hosted.

In step 402, one or more network metrics may be measured for one or more paths in a network. One or more computing devices (e.g., the first router 203a and/or the first switch 303a) may be queried (e.g., by the administrative computing device 305) for one or more network metrics. For example, the first router 302a may periodically report, to an administrative computing device (e.g., the administrative computing device 305), one or more network metrics for the hop between the first computing device 301 and the first router 302a and/or the second hop between the first router 302a and the first switch 303a. As another example, the first computing device 301 may be configured to periodically collect and transmit, e.g., to an administrative computing device, network metrics. An example of three communication paths with three different network metrics (average latency, average loss, and average jitter) measured is provided below in Table 1.

TABLE 1

| Communication Path | Average Latency | Average Loss | Average Jitter |
|---|---|---|---|
| Communication Path 1 | 100 ms | 0.2% | 8 ms |
| Communication Path 2 | 120 ms | 0.3% | 5 ms. |
| Communication Path 3 | 110 ms | 0.1% | 10 ms. |

In step 403, one or more QoS policies may be determined. A QoS policy may be any policy which governs the transmission of one or more packets in a network (e.g., over one or more communication paths). Different QoS policies may have different implications for a network. For example, some QoS policies may prioritize a first type of packet over a second type of packet, such that one or more communication paths in a network may more reliably transmit communications from a first type of application (e.g., an application transmitting primarily packets of the first type) as compared to a second type of application (e.g., an application transmitting primarily packets of the second type). A network may permit some QoS policies and prohibit others. For example, a QoS policy requiring persistent use of a single communication path may be prohibited because it may prevent the network from flexibly responding to bandwidth and latency changes. QoS policies may be implemented in a network by computing devices executing applications (e.g., the first computing device 301), by intermediary computing devices (e.g., the first router 302a), or the like.

A QoS policy may relate to packet duplication across multiple communication paths. A QoS policy may specify, for example, that packets transmitted along a first communication path should be duplicated and transmitted along a second communication path. Network metrics for such a QoS policy may be based on which packets are reached by a recipient computing device first. For example, if two copies of the same packet are transmitted along two different communication paths, the communication path with the lowest latency, jitter, and/or packet loss may transmit a packet to a recipient first, and the recipient may later receive (and, possibly, discard) the later-received duplicate packet. Returning to the example shown in Table 1, packet duplication across Communication Path 1 and Communication Path 3 may provide an average latency, loss, and jitter that is the minimum of the two communication paths: specifically, an average latency of 100 ms, an average loss of 0.1%, and an average jitter of 8 milliseconds.

A QoS policy may relate to load balancing across multiple communication paths in a network. A QoS policy may specify, for example, that the load of multiple packet transmissions is split across a plurality of different communication paths in a network. Such a QoS policy may apply across multiple computing devices and multiple applications such that, for example, load associated with multiple computing devices is approximately equally divided amongst multiple communication paths in a network. Such a QoS policy may be associated with a rule that transmissions be performed on a communication path, of a plurality of communication paths, having the lowest latency and with an amount of jitter that satisfies a threshold (as such network metrics may be associated with a path that has a relatively low load). Returning to the example shown in Table 1, assuming load balancing across all of the communication paths, a QoS policy relating to load balancing might cause, e.g., a next quantity of packets to be transmitted via Communication Path 1 because it has the lowest latency, suggesting it may have the lowest load.

A QoS policy may relate to retransmitting lost packets. Retransmitting lost packets may advantageously reduce or entirely eliminate packet loss in a network. While retransmitting lost packets may have a negative impact on certain protocols (such as the User Datagram Protocol (UDP)) because it may introduce additional latency, other protocols (such as the Transmission Control Protocol (TCP)) may be relatively less negatively impacted. Accordingly, for certain protocols, it may be desirable to implement a QoS policy requiring retransmission of lost (e.g., dropped or otherwise unaccounted for) packets in order to guarantee delivery of packets. Retransmission of packets may negatively impact one or more network metrics. For example, the jitter in a network may be increased by packet retransmission by at least the Round Trip Time (RTT) it takes to transmit the packet. As another example, the average latency of packet transmission may increase. In such a QoS policy, the expected latency and jitter of the network may be determined using formulae such as:

$$\text{Latency} = \frac{(\text{No. of Packets} * \text{Avg. Latency} + \text{No. of Packets Dropped} * (RTT + \text{Time to React})}{\text{Total Packets}}$$

$$\text{Jitter} = \frac{(\text{No. of Packets} * \text{Avg. Jitter} + \text{No. of Packets Dropped} * (RTT + \text{Time to React})}{\text{Total Packets}}$$

Returning to the example shown in Table 1, a QoS policy associated with retransmitting lost packets for Communication Path 1 may have a latency of 100 ms plus a retransmission time period, a loss of 0%, and a jitter of 8 milliseconds plus a retransmission time period.

A QoS policy may relate to persistently using a single communication path, of a plurality of communication paths, until the communication path is no longer available. Use of a single communication path, over time, may be ultimately more reliable than the potential uncertainty of changing communication paths in the network. Security concerns, such as use of a secure communication path in a network comprising a plurality of insecure and secure communication paths, may similarly merit persistent use of a single communication path. As such, returning to the example shown in Table 1, a persistent QoS policy would, e.g., use Communication Path 1 even if the average latency and average loss were to suddenly double.

The use of one or more of the QoS policies described above may have different implications with respect to one or more communication path in a network. For example, packet duplication may increase the load across two paths such that bandwidth in a network may drop significantly, but may nonetheless be desirable for short-duration packet transmissions which benefit from speed. As another example, retransmitting lost packets may increase the load across one or more paths and may increase jitter in a network, but may be desirable for critical transmissions for which packet loss is unacceptable.

In step 404, QoE metrics may be predicted for one or more communication paths in a network. The QoE metrics may be predicted based on one or more of the network metrics and/or one or more of the QoS policies. QoE metrics may be predicted using a model. For example, an administrative computing device (e.g., the administrative computing device 305) may be configured to generate, based on the network metrics, a model of the network. The administrative computing device may then be configured to test the implementation of one or more QoS policies on one or more communication paths in the network. The model may be configured to simulate, for example, faults in one or more communication paths, increases and decreases in a transmission frequency of one or more computing devices in the network, and the like. The model may be part of or implemented using a machine learning model. For example, a machine learning model may be trained using data comprising historical network metrics, QoS policies, and/or historical changes in communication paths, such that the machine learning model may be configured to recommend QoS policies and/or communication path change(s) based on input comprising measured network metrics, QoS policies, or the like.

The QoE metrics may be based on a history of communication path changes in a network. If a network has had a large number of recent communication path changes (e.g., communication path changes by other computing devices), then the network metrics measured in step 402 may be unreliable and/or unstable, or may not reflect the long-term operational status of the network. Moreover, if a network has not had many communication path changes for a long duration, then network metrics may be relatively stable and reliable. Communication paths may also have properties which may be determined via communication path changes over time. For example, one communication path may exhibit low latency and high bandwidth under certain conditions; however, experience with changes to that communication path may indicate that added load on that communication path may cause its latency to spike much higher than expected. As another example, one communication path may report network metrics which may indicate a moderate quantity of latency, but added load to the communication path may have been found to, over time, have an unexpectedly negligible impact on such latency.

In step 405, it may be determined, based on the predicted QoE metrics, whether an application executing on a computing device should switch from a first communication path to a second communication path. For example, the predicted QoE metrics may indicate that switching from a first communication path to a second communication path may improve one or more QoE metrics associated with an application. One or more of the predicted QoE metrics may be compared to the QoE metrics measured in step 401, and/or the one or more predicted QoE metrics may be compared to a threshold. For example, a communication path change may be determined based on a difference between a measured QoE metric and a predicted QoE metric satisfying a predetermined threshold. If a communication path change should be made, the flow chart proceeds to step 406. Otherwise, the flow chart returns to the beginning.

Even if QoE metrics indicate improvements in user experience associated with switching communication paths, it may be determined to not switch from a first communication path to a second communication path. For example, if a network has had a large quantity of recent communication path changes, then further changes to communication paths in the network may have undesirable and/or unexpected results.

In step 406, a communication path recommendation may be output. The path recommendation may comprise an indication of a communication path which may be associated with an improvement in one or more QoE metrics. The path recommendation may be output by, e.g., the administrative computing device 305. The communication path recommendation may be configured to cause one or more computing devices (e.g., the first computing device 301) to transmit data (e.g., packets) via a communication path (e.g., switch from a first communication path to a second communication path). The communication path recommendation may cause one or more computing devices to display a notification, to a user of the one or more computing devices, that a communication path change is recommended. For example, the communication path recommendation may cause display, on a display of the administrative computing device 305, of a message recommending that a network administrator cause a change in the network. The communication path recommendation may comprise an indication of a difference between measured QoE metrics and predicted QoE metrics. In this manner, a user might learn that, for example, changing from a first communication path to a second communication path may be associated with a degree of user experience improvement.

Figure 5:
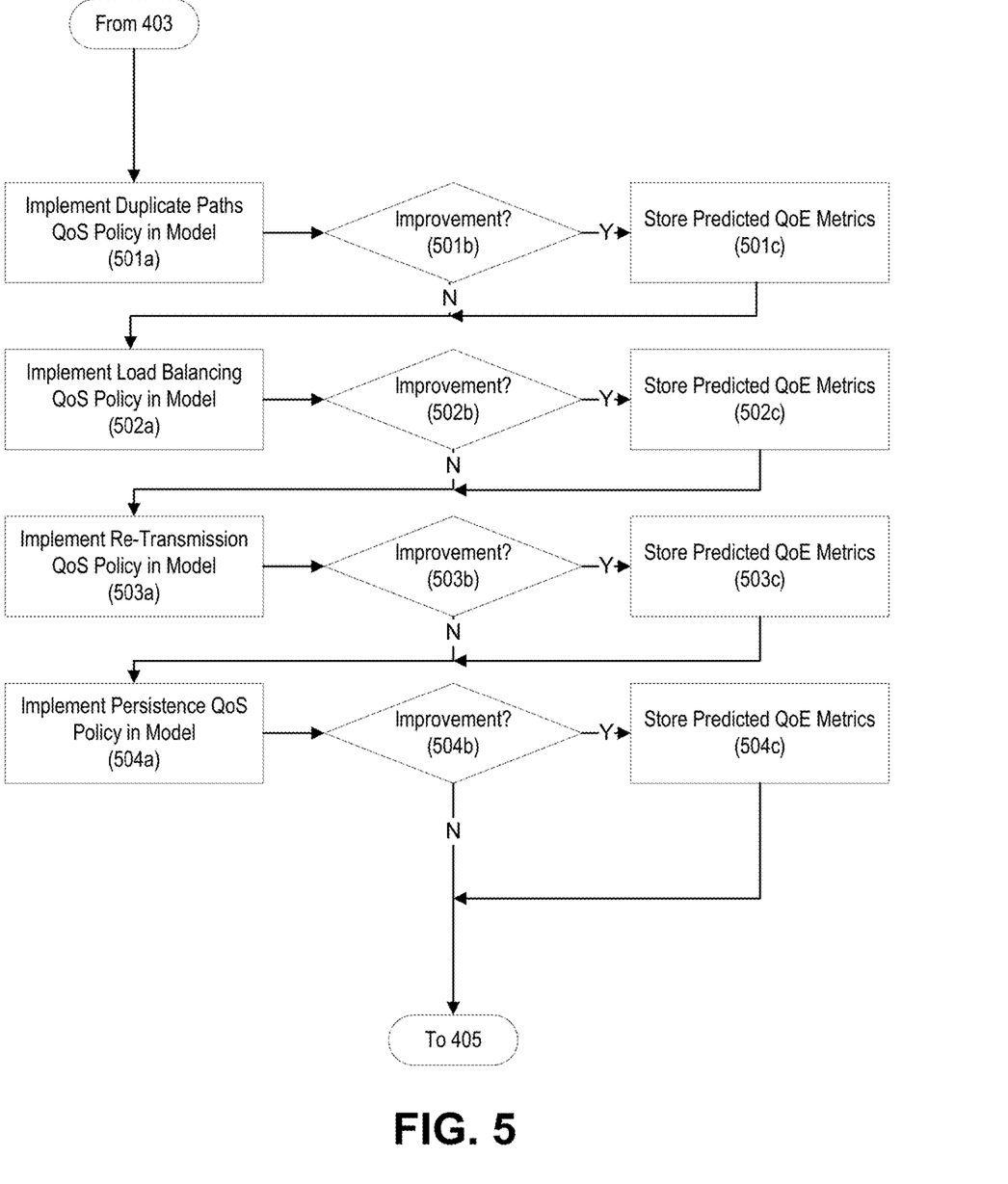
FIG. 5 is a flow chart comprising steps which may be performed to predict QoE metrics based on QoS policies.

FIG. 5 is a flow chart which illustrates steps which may be performed during step 404 of FIG. 4. Like FIG. 4, FIG. 5 may comprise or be part of an algorithm which may be executed on one or more computing devices. FIG. 5 illustrates a process wherein different QoS policies are tested with respect to a model network; however, a plurality of QoS policies may be tested. For example, a first QoS policy may be tested with respect to a first communication path in a model network, whereas a second QoS policy may be simultaneously tested with respect to a second communication path in the model network. As another example, the steps shown in FIG. 5 may be repeated for each communication path of a plurality of communication paths, a subset of communication paths, of a plurality of communication paths, that each satisfy a threshold (e.g., have a latency below a predetermined value), or the like.

Step 501a begins after step 403 of FIG. 4. In step 501a, a duplicate paths QoS policy may be tested in a model network. This implementation may generate one or more predicted QoE metrics. In step 501b, it is determined whether the one or more predicted QoE metrics are an improvement. Determining whether one or more predicted QoE metrics are an improvement may comprise comparing the one or more QoE metrics to a threshold (e.g., setting the one or more measured QoE metrics in step 401 as a threshold, such that predicted QoE metrics below that threshold are ignored). If the one or more QoE metrics are an improvement, the one or more predicted QoE metrics are stored in step 501c, and then the flow chart proceeds to step 502a. Otherwise, the flow chart proceeds to step 502a.

In step 502a, a load balancing QoS policy may be tested in a model network, and one or more predicted QoE metrics may be generated. In step 502b, it is determined whether the one or more predicted QoE metrics are an improvement. If so, the one or more predicted QoE metrics are stored in step 502c, and then the flow chart proceeds to step 503a. Otherwise, the flow chart proceeds to step 503a.

In step 503a, a re-transmission QoS policy may be tested in a model network, and one or more predicted QoE metrics may be generated. In step 503b, it is determined whether the one or more predicted QoE metrics are an improvement. If so, the one or more predicted QoE metrics are stored in step 503c, and then the flow chart proceeds to step 504a. Otherwise, the flow chart proceeds to step 504a.

In step 504a, a connection path persistence QoS policy may be tested in a model network, and one or more predicted QoE metrics may be generated. In step 504b, it is determined whether the one or more predicted QoE metrics are an improvement. If so, the one or more predicted QoE metrics are stored in step 504c, and the flow chart proceeds to step 405 of FIG. 4. Otherwise, the flow chart proceeds to step 405 of FIG. 4.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    receiving, by a first computing device, a quality of experience metric associated with an application executing on a second computing device, wherein the application uses a first communication path in a network of a plurality of communication paths to connect to a third computing device;
    determining one or more network metrics corresponding to each of the plurality of communication paths in the network;
    determining, for each communication path of the plurality of communication paths in the network, a plurality of predicted quality of experience metrics by:
        determining a plurality of quality of service policies which may be implemented using the communication path; and
        determining, for each quality of service policy of the quality of service policies, based on the one or more network metrics, and for the communication path, a predicted quality of experience metric for that quality of service policy;
    selecting, based on a comparison of the plurality of predicted quality of experience metrics:
        a second communication path of the plurality of communication paths in the network; and
        one of the plurality of quality of service policies; and
    causing output of an indication of the second communication path and the one of the plurality of quality of service policies.

2. The method of claim 1, wherein the one of the plurality of quality of service policies is associated with packet duplication across two or more of the plurality of communication paths.

3. The method of claim 1, wherein the one of the plurality of quality of service policies is associated with load balancing across two or more of the plurality of communication paths.

4. The method of claim 1, wherein the one of the plurality of quality of service policies is associated with retransmitting lost packets.

5. The method of claim 1, wherein the one of the plurality of quality of service policies is associated with using a single communication path, of the plurality of communication paths, until the single communication path is no longer available.

6. The method of claim 1, wherein causing output of the indication comprises causing the application to connect to the third computing device via the second communication path and using the one of the plurality of quality of service policies.

7. The method of claim 1, wherein causing output of the indication comprises causing display, on a display device, of a difference between the quality of experience metric and a second quality of experience metric corresponding to the second communication path.

8. The method of claim 1, wherein determining the plurality of predicted quality of experience metrics is based on a history of communication path changes in the network.

9. The method of claim 1, wherein selecting the second communication path is further based on determining that an impact, to the network, of changing from the first communication path to the second communication path satisfies a threshold.

10. A method comprising:
    determining, by a first computing device and for each communication path of a plurality of communication paths in a network, a plurality of predicted quality of experience metrics by:
        determining a plurality of quality of service policies which may be implemented using the communication path; and
        determining, for each quality of service policy of the quality of service policies and for the communication path, a predicted quality of experience metric for that quality of service policy;
    determining, for a second computing device executing an application, a first quality of experience metric, wherein the application uses a first communication path of the plurality of communication paths and a first quality of service policy of the plurality of quality of service policies to connect to a third computing device;
    comparing the first quality of experience metric with the plurality of predicted quality of experience metrics; and
    sending, based on the comparing, a message comprising:
        a second communication path of the plurality of communication paths; and
        a second quality of service policy of the plurality of quality of service policies.

11. The method of claim 10, wherein the second quality of service policy is associated with packet duplication across two or more of the plurality of communication paths.

12. The method of claim 10, wherein the second quality of service policy is associated with load balancing across two or more of the plurality of communication paths.

13. The method of claim 10, wherein the second quality of service policy is associated with retransmitting lost packets.

14. The method of claim 10, wherein the first second quality of service policy is associated with using a single communication path, of the plurality of communication paths, until the single communication path is no longer available.

15. The method of claim 10, wherein the message is configured to cause the application to connect via the second communication path and using the second quality of service policy.

16. A method comprising:
    receiving, by a first computing device, a quality of experience metric associated with an application executing on a second computing device, wherein the application uses a first communication path, in a network, to connect to a third computing device, and wherein the first communication path is associated with a first quality of service policy;
    determining, for the first communication path and a second communication path in the network, network metrics;
    determining, for the first communication path and based on the network metrics, a first predicted quality of experience metric associated with a second quality of service policy;

determining, for the second communication path and based on the network metrics:
- a second predicted quality of experience metric associated with the first quality of service policy; and
- a third predicted quality of experience metric associated with the second quality of service policy;

comparing the first predicted quality of experience metric, the second predicted quality of experience metric, and the third predicted quality of experience metric; and sending, based on the comparing, a message, wherein the message comprises:
- a first indication of the first communication path or the second communication path; and
- a second indication of the first quality of service policy or the second quality of service policy.

17. The method of claim 16, wherein the first quality of service policy is associated with packet duplication across two or more communication paths in the network.

18. The method of claim 16, wherein the first quality of service policy is associated with load balancing across two or more communication paths in the network.

19. The method of claim 16, wherein the first quality of service policy is associated with retransmitting lost packets.

20. The method of claim 16, wherein the first quality of service policy is associated with using a single communication path until the single communication path is no longer available.

* * * * *